United States Patent
Seo et al.

(10) Patent No.: US 9,988,981 B2
(45) Date of Patent: Jun. 5, 2018

(54) THERMAL INSULATION COATING COMPOSITION AND THERMAL INSULATION COATING LAYER

(71) Applicant: Hyundai Motor Company, Seoul (KR)

(72) Inventors: Jiyoun Seo, Gyeonggi-Do (KR); Bokyung Kim, Gyeonggi-Do (KR); Kwang Hoon Choi, Gyeonggi-Do (KR); Seung Woo Lee, Seoul (KR); Woong Pyo Hong, Seoul (KR); In Woong Lyo, Gyeonggi-Do (KR); Hong Kil Baek, Seoul (KR)

(73) Assignee: Hyundai Motor Company, Seoul (KR)

( * ) Notice: Subject to any disclaimer, the term of this patent is extended or adjusted under 35 U.S.C. 154(b) by 375 days.

(21) Appl. No.: 14/547,450

(22) Filed: Nov. 19, 2014

(65) Prior Publication Data

US 2015/0184588 A1 Jul. 2, 2015

(30) Foreign Application Priority Data

Dec. 31, 2013 (KR) ........................ 10-2013-0168491

(51) Int. Cl.
*F02B 77/11* (2006.01)
*C08K 5/5333* (2006.01)
*C09D 7/12* (2006.01)
*C09D 183/00* (2006.01)
*C09D 183/04* (2006.01)

(52) U.S. Cl.
CPC ............ *F02B 77/11* (2013.01); *C08K 5/5333* (2013.01); *C09D 7/1233* (2013.01); *C09D 183/00* (2013.01); *C09D 183/04* (2013.01); *Y10T 428/249953* (2015.04)

(58) Field of Classification Search
CPC .. C08K 5/5333; C09D 183/00; C09D 183/04; C09D 7/1233; F02B 77/11; Y10T 428/249953
USPC ............................................... 428/220, 304.4
See application file for complete search history.

(56) References Cited

U.S. PATENT DOCUMENTS

| 4,954,327 A * | 9/1990 | Blount ................ C01B 33/1585 |
| | | 106/18.12 |
| 2002/0064642 A1* | 5/2002 | Albert .................. C04B 35/524 |
| | | 428/315.5 |
| 2004/0152085 A1* | 8/2004 | Terlesky ............ B01J 20/28047 |
| | | 435/6.12 |
| 2006/0024337 A1* | 2/2006 | Simonnet ............. A61K 8/0291 |
| | | 424/401 |

FOREIGN PATENT DOCUMENTS

| CN | 1878667 A | 12/2006 |
| CN | 101679657 A | 3/2010 |
| CN | 102079949 A | 6/2011 |
| JP | 2002-504644 A | 2/2002 |
| JP | 2011-162756 A | 8/2011 |
| KR | 10-2012-0023707 A | 3/2012 |
| KR | 10-2013-0039028 A | 4/2013 |

* cited by examiner

*Primary Examiner* — Lawrence Ferguson
(74) *Attorney, Agent, or Firm* — Mintz Levin Cohn Ferris Glovsky and Popeo, P.C.; Peter F. Corless

(57) ABSTRACT

Disclosed is a thermal insulation coating composition including: a polymer resin; an aerogel; and an amphiphilic compound including specific functional groups and having a weight average molecular weight of about 200 to about 5000. A thermal insulation coating layer obtained from the thermal insulation coating composition is also provided.

17 Claims, No Drawings

THERMAL INSULATION COATING COMPOSITION AND THERMAL INSULATION COATING LAYER

CROSS REFERENCE TO RELATED APPLICATION

The present application claims priority to Korean Patent Application No. 10-2013-0168491 filed on Dec. 31, 2013, the entire contents of which is incorporated herein for all purposes by this reference.

TECHNICAL FIELD

The present invention relates to a thermal insulation coating composition and a thermal insulation coating layer. The thermal insulation coating composition and the thermal insulation coating layer may substantially improve mechanical properties and heat resistance of the coating and have reduced thermal conductivity and reduced density. As such, thermal energy emitted to the outside may decrease to thereby improve efficiency of an internal combustion engine and fuel efficiency of a vehicle when the thermal insulation coating is applied to the internal combustion engine. Furthermore, improved adhesion of the coating to the internal combustion engine and components of the internal combustion engine may be obtained.

BACKGROUND

An internal combustion engine is an engine in which a combustion gas generated by combusting fuel directly acts on a piston, a turbine blade, or the like, so that thermal energy of the fuel is converted into mechanical energy. The internal combustion engine may refer to a reciprocation type of engine in which ignition and explosion of a mixed gas of fuel and air occurs in a cylinder to move the piston, and a gas turbine, a jet engine, a rocket engine, and the like are also included as internal combustion engines.

The internal combustion engine may be classified into a gas engine, a gasoline engine, a petroleum engine, a diesel engine, and the like, according to the fuel type for combustion. The petroleum/gas/gasoline engine typically are ignited by an electric spark from a spark plug, and in the diesel engine, the fuel is sprayed at an elevated temperature and an elevated pressure to thereby ignite automatically. In addition, according to the type of stroke and operation of the piston, the internal combustion engine may be a 4-stroke engine or a 2-stroke engine.

The internal combustion engine of a vehicle generally has thermal efficiency of about 15 to 35%, but even at the maximum efficiency of the internal combustion engine, about 60% or greater of the generated thermal energy is emitted to the exterior through a wall of the internal combustion engine, by exhaust gas and the like.

Since reducing an amount of the thermal energy emitted to the exterior through the wall of the internal combustion engine may increase the efficiency of the internal combustion engine, methods such as installing a thermal insulation material at an exterior portion of the internal combustion engine, partially changing a material or a structure of the internal combustion engine, or developing a cooling system of the internal combustion engine have been used.

Particularly, when emission of heat generated by the internal combustion engine to the exterior through the wall of the internal combustion engine is minimized, the efficiency of the internal combustion engine and the fuel efficiency of the vehicle may be improved. However, research into a thermal insulation material, a thermal insulation structure, or the like which is capable of being maintained for an extended period time in the internal combustion engine to which the elevated temperature and the elevated pressure conditions are repeatedly applied has not yet been sufficiently conducted.

In the related arts, methods of using an aerogel for a thermal insulation material, an impact limiter, a soundproofing material, or the like, have been developed. This aerogel may have a structure in which microfilaments having a thickness of about one ten-thousandth the thickness of a human hair are entangled and has porosity of about 90% or greater, and a main material of the aerogel may be a silicon oxide, carbon, or an organic polymer. Particularly, the aerogel material may have a substantially reduced density having improved translucency and significantly reduced thermal conductivity due to the structural features as described above.

However, since the aerogel may not have sufficient strength to thereby be easily broken even by a weak impact due to high brittleness and various thicknesses and shapes may not be produced from the aerogel, use of the aerogel as a thermal insulation material may be limited although the aerogel has improved thermal insulation property. Further, when the aerogel is mixed with other reactants, a solvent or solute may infiltrate into the aerogel and a viscosity of a compound may increase, such that mixing may not be properly performed. Accordingly, when the aerogel composite is formed with other materials or the aerogel is used together with other materials, suitable properties of porous aerogel may not be exhibited.

SUMMARY OF THE INVENTION

The present invention provides a thermal insulation coating composition and a thermal insulation coating layer which may have substantially improved mechanical properties and heat resistance and may have reduced thermal conductivity and reduced density. As such, thermal energy emitted to the outside may decrease to thereby improve efficiency of an internal combustion engine and fuel efficiency of a vehicle when the thermal insulation coating is applied to the internal combustion engine. Furthermore, adhesion of the thermal insulation coating to the internal combustion engine and components of the internal combustion engine may be improved.

In one aspect, the present invention provides a thermal insulation coating composition. The thermal insulation coating composition may include: a polymer resin suitably dispersed in an aqueous or polar solvent; an aerogel; and an amphiphilic compound. In particular, the amphiphilic compound may include at least one phosphate or phosphate ester functional group and at least one reactive functional group and has a weight average molecular weight of about 200 to about 5000.

The aqueous or polar solvent may comprise at least one selected from the group consisting of methyl ethyl ketone, methyl alcohol, ethyl alcohol, propyl alcohol, n-butyl alcohol, iso-butyl alcohol, tert-butyl alcohol, water, and ethylacetate.

The polymer resin may be at least one selected from the group consisting of a polyimide, a polyimideamide, a silicone resin, a polyamide, polytetrafluoroalkylene, polyethylene nitrile, polyethersulfone, and poly(meth)acrylate.

The polymer resin may have a weight average molecular weight of about 3000 to about 300,000.

The aerogel may be at least one compound selected from the group consisting of a silicon oxide, carbon, a polyimide, and a metal carbide. In addition, the aerogel may have a specific surface area of about 100 to about 1000 cm$^2$/g.

The reactive functional group in the amphiphilic compound may be one selected from the group consisting of an amine group, a hydroxyl group, a carboxylic group, a vinyl group, a (meth)acrylate group, an epoxy group, and an amide group.

In an exemplary embodiment, the thermal insulation coating composition of claim 1 may comprise: an amount of about 15 to about 95 wt % of the polymer resin suitably dispersed in an aqueous or polar solvent; an amount of about 1 to about 60 wt % of the aerogel; and an amount of about 0.1 to about 30 wt % of the amphiphilic compound including at least one phosphate or phosphate ester functional group and at least one reactive functional group and having a weight average molecular weight of about 200 to about 5000.

In addition, in the thermal insulation coating of the present invention, a solid content of the polymer resin in the aqueous solvent may be from about 5 to about 75 wt %.

The thermal insulation coating composition may be used at an inner surface of an internal combustion engine or coating of a component of the internal combustion engine.

In another aspect, provided is a thermal insulation coating layer. The thermal insulation coating layer may include: a polymer resin, aerogels respectively dispersed in the polymer resin, and an amphiphilic compound which includes at least one phosphate or phosphate ester functional group and at least one reactive functional group and has a weight average molecular weight of about 200 to about 5000.

The thermal insulation coating layer may have peel strength of about 9.5 N or greater with respect to a metal. In addition, the thermal insulation coating layer may have thermal capacity of about 1350 KJ/m$^3$ K or less. Moreover, the thermal insulation coating layer may thermal conductivity of about 0.50 W/m or less. The thermal insulation coating layer may have a thickness of about 50 μm to about 500 μm.

The thermal insulation coating layer may also be formed on an inner surface of an internal combustion engine or a component of the internal combustion engine.

DETAILED DESCRIPTION OF THE INVENTION

In one aspect, a thermal insulation coating composition is provided. The composition may include: a polymer resin suitably or optionally dispersed in an aqueous or polar solvent; an aerogel; and an amphiphilic compound including at least one phosphate or phosphate ester functional group and at least one reactive functional group and having a weight average molecular weight of about 200 to 5000.

In another aspect, a thermal insulation coating layer is provided. The coating layer may include: a polymer resin; aerogels respectively dispersed in the polymer resin; and an amphiphilic compound including at least one phosphate or phosphate ester functional group and at least one reactive functional group and having a weight average molecular weight of about 200 to about 5000.

Hereinafter, the thermal insulation coating composition and the thermal insulation coating layer according to exemplary embodiments of the present invention will be described in detail.

According to an exemplary embodiment of the present disclosure, a thermal insulation coating may include: a polymer resin suitably or optionally dispersed in an aqueous or polar solvent; an aerogel; and an amphiphilic compound including at least one phosphate or phosphate ester functional group and at least one reactive functional group and having a weight average molecular weight of about 200 to about 5000.

When the amphiphilic compound includes at least one phosphate or phosphate ester functional group and at least one reactive functional group and having a weight average molecular weight of about 200 to about 5000, compatibility and dispersibility of the polymer resin and the aerogel in the thermal insulation coating composition may be improved, such that a finally prepared thermal insulation coating membrane may have improved uniform physical properties. Moreover, as the aerogel may be uniformly dispersed in the polymer resin, the thermal insulation coating membrane formed from the thermal insulation coating composition may have reduced thermal conductivity and thermal capacity, such that improved thermal insulation performance may be obtained.

Further, due to the functional group included in the amphiphilic compound, the thermal insulation coating membrane formed from the thermal insulation coating composition may have physical properties such as improved mechanical strength and heat resistance, and the like, and may have improved adhesive force or peel strength with respect to a metal surface at an inner wall of an internal combustion engine, an outer surface of a component of the internal combustion engine, or the like.

The thermal insulation coating composition according to an exemplary embodiment may provide a thermal insulation material, a thermal insulation structure, or the like, which may maintain for an extended period of time in the internal combustion engine to which elevated temperature and elevated pressure conditions are repeatedly applied. In particular, the thermal insulation coating composition according to an exemplary embodiment may be used at an inner surface of the internal combustion engine or coating of a component of the internal combustion engine.

The polymer resin, as used herein, may be included in the thermal insulation coating composition according to an exemplary embodiment. The polymer resin may be selected based on physical properties required for a final thermal insulation coating layer, or the like. The polymer resin may be, but not limited to, a polyimide, a polyimideamide, a silicone resin, a polyamide, polytetrafluoroalkylene, a polyethylene nitrile, polyethersulfone, poly(meth)acrylate, a mixture comprising at least two thereof, or a copolymer of at least two thereof.

The polymer resin may have a weight average molecular weight of about 3000 to 300,000.

When the weight average molecular weight of the polymer resin is substantially less than the predetermined value, or less than about 3,000, sufficient mechanical properties, heat resistance, or thermal insulation of a coating layer may not be obtained, and thus a coating film, or a coating membrane obtained from the thermal insulation coating composition, and the polymer resin may easily infiltrate into the aerogel. Further, when the weight average molecular weight of the polymer resin is substantially greater than the predetermined value, or greater than about 300,000, uniformity or homogeneity of the coating layer, the coating film, or the coating membrane obtained from the thermal insulation coating composition may be deteriorated, and further dispersibility of the aerogel in the thermal insulation coating composition may be deteriorated. Moreover, when the thermal insulation coating composition is applied, the composition may block a nozzle of an application device. In addition, a heat treatment time of the thermal insulation coating composition may increase, and a heat treatment temperature may also increase.

The aqueous or polar solvent may be, but not limited to, at least one selected from a group consisting of methyl ethyl ketone, methyl alcohol, ethyl alcohol, propyl alcohol, n-butyl alcohol, iso-butyl alcohol, tert-butyl alcohol, water, and ethylacetate.

The aerogel, as used herein, a typical aerogel known in the art may be used without limitation. In particular, the aerogel may be formed of a silicon oxide, carbon, a polyimide, a metal carbide, or a mixture comprising at least two thereof.

The aerogel may have a specific surface area of about 100 to about 1000 cm²/g, or particularly, about 300 to about 900 cm²/g.

The amphiphilic compound may include at least one phosphate or phosphate ester functional group and at least one reactive functional group.

Further, the amphiphilic compound may have a weight average molecular weight of about 200 to about 5000.

In particular, the phosphate functional group in the amphiphilic compound may provide improved thermal insulation coating membrane prepared from the thermal insulation coating composition due to improved adhesive force or peel strength with respect to a metal.

In addition, the reactive functional group in the amphiphilic compound may bind to the polymer resin, and the thermal insulation coating membrane prepared from the thermal insulation coating composition may have improved crosslink density, or the like, due to the reactive functional group, thereby providing improved mechanical strength and heat resistance.

The reactive functional group, as used herein, refers to a functional group causing a polymerization reaction or a crosslink reaction when heat or light is applied thereto. The reactive functional group may be, but not limited to, an ethylene or alkene group including double bond capable of performing a radical reaction, an amine group capable of performing a polycondensation reaction, a hydroxyl group, a carboxylic group, a vinyl group, a (meth)acrylate group, an epoxy group, or an amide group.

The functional group may be primarily copolymerized or polycondensed with a resin capable of being used as a binder to increase binding force, such that at the time of being mixed with the aerogel powder, the functional group may be uniformly mixed with the powder, and at the time of heat treatment for drying, the functional group may prevent phase-separation of the aerogel powder and a surfactant.

The amphiphilic compound may further include a length adjusting part which may influence a molecular weight of the compound in addition to at least one phosphate or phosphate ester functional group and at least one reactive functional group.

The length adjusting part in the amphiphilic compound as described above may be, but not limited to, an aliphatic, alicyclic, or aromatic hydrocarbon, or a divalent functional group derived from one compound selected from the group consisting of ester-based compounds, ether-based compounds, urethane-based compounds, amine-based compounds, (meth)acrylate based-compounds, and carbonate-based compounds.

In particular, the amphiphilic compound may include a reactive functional group including a carboxylic or hydroxyl group at a first end, the phosphate or phosphate ester functional group at a second end, and an alkylene group having about 2 to about 30 carbon atoms which is positioned between the reactive functional group and the phosphate or phosphate ester functional group.

The thermal insulation coating composition according to an exemplary embodiment may include: the polymer resin dispersed in the aqueous solvent; the aerogel; and the amphiphilic compound which includes at least one phosphate or phosphate ester functional group and at least one reactive functional group and has a weight average molecular weight of about 200 to about 5000. The content of each ingredient thereof may vary depending on desired physical properties of a finally prepared thermal insulation coating membrane or a corresponding portion of an internal combustion engine to which the thermal insulation coating composition is applied or the like.

The thermal insulation coating composition may include an amount from about 15 to about 95 wt % of the polymer resin preferably or optionally dispersed in the aqueous or polar solvent, an amount from about 1 to about 60 wt % of the aerogel, and an amount from about 0.1 to about 30 wt % of the amphiphilic compound which may include at least one phosphate or phosphate ester functional group and at least one reactive functional group and may have a weight average molecular weight of about 200 to about 5000, based on the total weight of the thermal insulation coating composition.

The thermal insulation coating composition may include an amount from about 5 to about 50 parts by weight or an amount from about 10 to about 45 parts by weight of the aerogel based on 100 parts by weight of the polymer resin. A weight ratio of the polymer resin and the aerogel may be a weight ratio of a solid content excluding the dispersion solvent.

When a content of the aerogel to the polymer resin is substantially less than a predetermined amount, or less than about 1 wt %, thermal conductivity and density of the coating layer, the coating film, or the coating membrane obtained from the thermal insulation coating composition may not be reduced, sufficient thermal insulation may not be obtained, and heat resistance of a thermal insulation membrane prepared from the thermal insulation coating composition may be reduced. Further, when the content of the aerogel to the polymer resin is substantially greater than the predetermined amount, or greater than about 60 wt %, physical properties of the coating layer, the coating film, or the coating membrane obtained from the thermal insulation coating composition may not be obtained, a crack may be generated in the thermal insulation membrane prepared from the thermal insulation coating composition, or a shape of a coating membrane of the thermal insulation membrane may not be firmly maintained.

A solid content of the polymer resin in the aqueous or polar solvent may not be particularly limited, but may be in an amount from about 5 to about 75 wt % in consideration of uniformity or physical properties of the thermal insulation coating composition.

According to an exemplary embodiment of the present invention, a thermal insulation coating layer is provided. The thermal insulation coating layer may include: a polymer resin; aerogels preferably or optionally dispersed in the polymer resin; and an amphiphilic compound including at least one phosphate or phosphate ester functional group and at least one reactive functional group and having a weight average molecular weight of 200 to 5000.

According to various exemplary embodiments of the present invention, the thermal insulation coating layer may have improved mechanical properties and heat resistance and may also have low thermal conductivity and low density. As such, thermal energy emitted to the outside may be significantly reduced to thereby improve efficiency of the internal combustion engine and fuel efficiency of a vehicle when the thermal insulation coating layer is applied to an internal combustion engine, and high adhesion to the internal combustion engine and components of the internal combustion engine may be obtained using the thermal insulation coating composition. According to exemplary embodiments of the present invention, in the thermal insulation coating layer, the aerogel may be uniformly dispersed in the polymer resin, such that physical properties implemented by the aerogel, for example, low thermal conductivity and low density, may be substantially obtained. In addition, physical properties implemented by the polymer resin, for example, high mechanical properties, heat resistance, and the like, may be implemented at an equivalent or greater as compared to the case when only the polymer resin is used.

Accordingly, the thermal insulation coating layer may have low thermal conductivity and high thermal capacity. The thermal insulation coating layer according to an exemplary embodiment may have thermal conductivity of about 0.60 W/m or less, about 0.50 W/m or less, or particularly from about 0.50 to about 0.200 W/m, and high thermal capacity of about 1350 KJ/m$^3$ K or less or particularly from about 1000 to about 1350 KJ/m$^3$ K.

In addition, the thermal insulation coating layer may have peel strength of about 9.5 N or greater, or particularly, from about 9.5 to about 30 N, with respect to a metal. The thermal insulation coating layer may include the amphiphilic compound dispersed in the polymer resin to thereby have improve adhesive force or peel strength with respect to a metal surface at an inner wall of an internal combustion engine, an outer surface of a component of the internal combustion engine or the like.

The thermal insulation coating layer according to an exemplary embodiment may provide a thermal insulation material, a thermal insulation structure or the like which may be maintained for an extended period of time in the internal combustion engine to which elevated temperature and elevated pressure conditions are repeatedly applied. In particular, the thermal insulation coating layer may be formed on an inner surface of an internal combustion engine or a component of the internal combustion engine.

A thickness of the thermal insulation coating layer according to an exemplary embodiment may be determined depending on a field or a position to which the thermal insulation coating layer is applied, or desired physical properties. For example, the thermal insulation coating layer may have a thickness of from about 50 to about 500 μm.

The thermal insulation coating layer according to an exemplary embodiment may include in an amount from about 5 to about 50 parts by weight, or particularly, in an amount from about 10 to about 45 parts by weight of the aerogel based on 100 parts by weight of the polymer resin.

As described above, when a content of the aerogel to the polymer resin is substantially less than the predetermined amount, or less than about 5 part by weight, thermal conductivity and density of the thermal insulation coating layer may not be reduced, sufficient thermal insulation may not be obtained, and heat resistance of the thermal insulation coating layer may decrease. Further, when the content of the aerogel with respect to the polymer resin is substantially greater than the predetermined amount, or greater than about 50 parts by weight, sufficient physical properties of the coating layer, the coating film, and the coating membrane prepared from the thermal insulation coating composition may not be obtained, a crack may be generated in the thermal insulation membrane prepared from the thermal insulation coating composition, or a shape of a coating membrane of the thermal insulation membrane may not be maintained firmly.

The polymer resin may have a weight average molecular weight of about 3000 to about 300,000.

The aerogel may include at least one compound selected from the group consisting of a silicon oxide, carbon, a polyimide, and a metal carbide.

The aerogel may have a specific surface area of about 100 to about 1000 cm$^2$/g.

In an exemplary embodiment, the thermal insulation coating layer may be obtained by drying the thermal insulation coating composition according to the above-mentioned exemplary embodiment. A device or a method which may be used to dry the thermal insulation coating composition according to an exemplary embodiment may not be particularly limited. The method may be naturally drying the composition at room temperature or greater temperature, or heating the composition at 50° C. or greater to dry the composition or the like.

For example, an exemplary thermal insulation coating composition may be coated on a target such as an inner surface of the internal combustion engine or an outer surface of a component of the internal combustion engine and subsequently semi-dried at a temperature of about 50 to about 200° C. one time, and then the semi-dried coating composition may be completely dried at a temperature of about 200° C. or greater, thereby forming the thermal insulation coating layer. However, a method of applying the thermal insulation coating layer may not limited to specific examples.

According to various exemplary embodiments of the present invention, the thermal insulation coating composition and the thermal insulation coating layer may have improved mechanical properties and heat resistance and may have reduced thermal conductivity and reduced density, thereby decreasing thermal energy emitted to the outside and further improving efficiency of an internal combustion engine and fuel efficiency of a vehicle then the thermal insulation coating composition or the thermal insulation coating layer is applied to the internal combustion engine. In addition, adhesion to the internal combustion engine and components of the internal combustion engine of the composition or layer may be substantially improved.

The exemplary embodiments will be described in more detail in the following examples. However, the following examples are to illustrate the exemplary embodiments, and the scope of the present invention is not limited to the following examples.

Examples 1 to 3

(1) Preparation of Thermal Insulation Coating Composition

Porous silica aerogel having specific surface area of about 500 cm$^2$/g was dispersed in ethyl alcohol and a silicon polymer resin having weight average molecular weight of about 10 g was dispersed in an aqueous solvent such as methyl ethyl ketone (MEK). The porous silica aerogel, the silicon polymer resin and the about 0.1 g of a compound of the following Chemical Formula 1 were put into a reactor and mixed at a temperature of about 60° C. and stirred at about 300 to about 500 rpm under atmospheric pressure using a mechanical stirrer, thereby preparing a thermal insulation coating composition (coating solution). Contents of the amphiphilic compound (wt %) and aerogel (wt %) of Examples 1 to 3 are disclosed in the following Table 1.

[Chemical Formula 1]

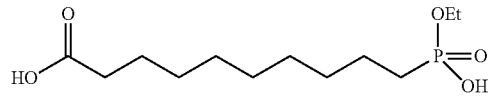

(2) Formation of Thermal Insulation Coating Layer

Each of the obtained thermal insulation coating composition was applied onto a piston for a vehicle engine by a spray coating method. Then, after the thermal insulation coating composition is applied onto the piston, the coating was primarily semi-dried at about 150° C. for about 10 minutes, the thermal insulation coating composition was applied again and secondarily semi-dried at about 150° C. for about 10 minutes. After the secondary semi-drying, the thermal insulation coating composition was applied again and completely dried at about 250° C. for about 60 minutes, thereby forming a thermal insulation coating layer on the piston. A thickness of each formed coating layer of Examples 1-3 is as shown in the following Table 1.

Comparative Example 1

A thermal insulation coating composition and a thermal insulation coating layer were prepared by the same method as in Example 1, except for using a PE/PO block copolymer non-ionic surfactant (prepared by BASF Corp.) instead of the amphiphilic compound.

Experimental Example

1. Experimental Example 1: Measurement of Thermal Conductivity

Thermal conductivity of each coating layers on the piston in Examples 1 to 3 and Comparative Example 1 was measured at room temperature under atmospheric pressure by a thermal diffusion measuring method using a laser flash based on a standard ASTM E1461 method.

2. Experimental Example 2: Measurement of Thermal Capacity

Specific heat of each coating layers on the piston in Examples 1 to 3 and Comparative Example 1 was measured at room temperature using a differential scanning calorimetry (DSC) apparatus compared to sapphire used as a reference, thereby confirming thermal capacity based on a standard ASTM E1269 method.

3. Experimental Example 3: Measurement of Peel Strength

Adhesive force between the piston and each coating layers in Examples 1 to 3 and Comparative Example 1 was measured by scraping a thin film having a length of about 10 mm using a fine needle while a load is applied using an adhesive force measuring device (CSM Corp.) based on a ISO 20502 standard method.

TABLE 1

| | Content of Amphiphilic Compound (wt %) | Content of Aerogel (wt %) | Thickness of Coating Layer ((μm) | Thermal Conductivity of Coatig Layer [W/m] | Thermal Capacity of Coating Layer [KJ/m$^3$ K] | Peel Strength between Metal Surface and Thermal Insulation Coating Layer [N] |
|---|---|---|---|---|---|---|
| Example 1 | 0.1 | 20 | 100 | 0.423 | 1320 | 10.1 |
| Example 2 | 0.2 | 20 | 100 | 0.340 | 1317 | 11.2 |
| Example 3 | 0.5 | 20 | 100 | 0.331 | 1297 | 16.0 |
| Comparative Example 1 | 0.1 | 20 | 100 | 0.422 | 1320 | 9.1 |

As shown in Table 1, the thermal insulation coating layers in Examples 1 to 3 may have thermal capacity of about 1320 KJ/m$^3$ K or less, thermal conductivity of about 0.423 W/m or less, and peel strength of about 10.1 N or greater with respect to a metal surface at a thickness of about 100 μm.

As such, the thermal insulation coating layers in Examples 1 to 3 may decrease thermal energy emitted to the outside when the coating layers are applied to an internal combustion engine to thereby improve efficiency of the internal combustion engine and fuel efficiency of a vehicle. In addition, adhesive force thereof to the internal combustion engine and a component of the internal combustion engine may be improved substantially to thereby implement excellent durability.

What is claimed is:

1. A thermal insulation coating composition comprising:
   a polymer resin;
   an aerogel; and
   an amphiphilic compound which includes a reactive functional group including a carboxylic or hydroxyl group at a first end, the phosphate or phosphate ester functional group at a second end, and an alkylene group having about 2 to about 30 carbon atoms which is positioned between the reactive functional group and the phosphate or phosphate ester functional group and has a weight average molecular weight of about 200 to about 5000,
   wherein the aerogel has a specific surface area of about 100 to about 1000 cm$^2$/g.

2. The thermal insulation coating composition of claim 1, wherein the thermal insulation coating composition is used at an inner surface of an internal combustion engine or coating of a component of the internal combustion engine.

3. The thermal insulation coating composition of claim 1, wherein the polymer resin is dispersed in an aqueous or polar solvent.

4. The thermal insulation coating composition of claim 3, wherein the aqueous or polar solvent comprises at least one selected from the group consisting of methyl ethyl ketone, methyl alcohol, ethyl alcohol, propyl alcohol, n-butyl alcohol, iso-butyl alcohol, tert-butyl alcohol, water, and ethylacetate.

5. The thermal insulation coating composition of claim 1, wherein the polymer resin is at least one selected from the group consisting of a polyimide, a polyimideamide, a silicone resin, a polyamide, polytetrafluoroalkylene, polyethylene nitrile, polyethersulfone, and poly(meth)acrylate.

6. The thermal insulation coating composition of claim 5, wherein the polymer resin has a weight average molecular weight of about 3000 to about 300,000.

7. The thermal insulation coating composition of claim 1, wherein the aerogel is at least one compound selected from the group consisting of a silicon oxide, carbon, a polyimide, and a metal carbide.

8. The thermal insulation coating composition of claim 1, comprising:
   an amount of about 15 to about 95 wt % of the polymer resin dispersed in an aqueous or polar solvent;
   an amount of about 1 to about 60 wt % of the aerogel; and
   an amount of about 0.1 to about 30 wt % of the amphiphilic compound including at least one phosphate or phosphate ester functional group and at least one reactive functional group and having a weight average molecular weight of about 200 to about 5000.

9. The thermal insulation coating composition of claim 1, wherein a solid content of the polymer resin in an aqueous or polar solvent is from about 5 to about 75 wt %.

10. A thermal insulation coating layer, comprising: a polymer resin, aerogels respectively dispersed in the polymer resin, and an amphiphilic compound includes a reactive functional group including a carboxylic or hydroxyl group at a first end, the phosphate or phosphate ester functional group at a second end, and an alkylene group having about 2 to about 30 carbon atoms which is positioned between the reactive functional group and the phosphate or phosphate ester functional group and has a weight average molecular weight of about 200 to about 5000,
   wherein the aerogel has a specific surface area of about 100 to about 1000 cm²/g.

11. The thermal insulation coating layer of claim 10, wherein the thermal insulation coating layer has peel strength of about 9.5 N or greater with respect to a metal.

12. The thermal insulation coating layer of claim 10, wherein the thermal insulation coating layer has thermal capacity of about 1350 KJ/m³ K or less.

13. The thermal insulation coating layer of claim 10, wherein the thermal insulation coating layer has thermal conductivity of about 0.50 W/m or less.

14. The thermal insulation coating layer of claim 10, wherein the thermal insulation coating layer has a thickness of about 50 μm to about 500 μm.

15. The thermal insulation coating layer of claim 10, wherein the thermal insulation coating layer is formed on an inner surface of an internal combustion engine or a component of the internal combustion engine.

16. The thermal insulation coating layer of claim 10, wherein the amphiphilic compound comprises a compound of Chemical Formula 1:

[Chemical Formula 1]

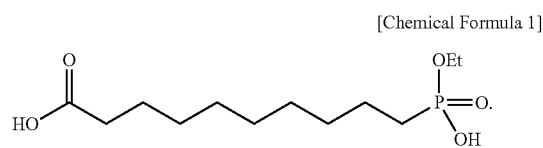

17. The thermal insulation coating composition of claim 1, wherein the amphiphilic compound comprises a compound of Chemical Formula 1:

[Chemical Formula 1]

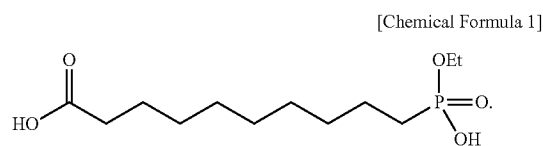 [SMILES: CCOP(=O)(O)CCCCCCCCCC(=O)O]

* * * * *